Nov. 9, 1954  C W. MUSSER ET AL  2,693,645
COMBINATION CALIPER AND RADIUS MEASURING INSTRUMENT
Filed Oct. 9, 1953  2 Sheets-Sheet 1
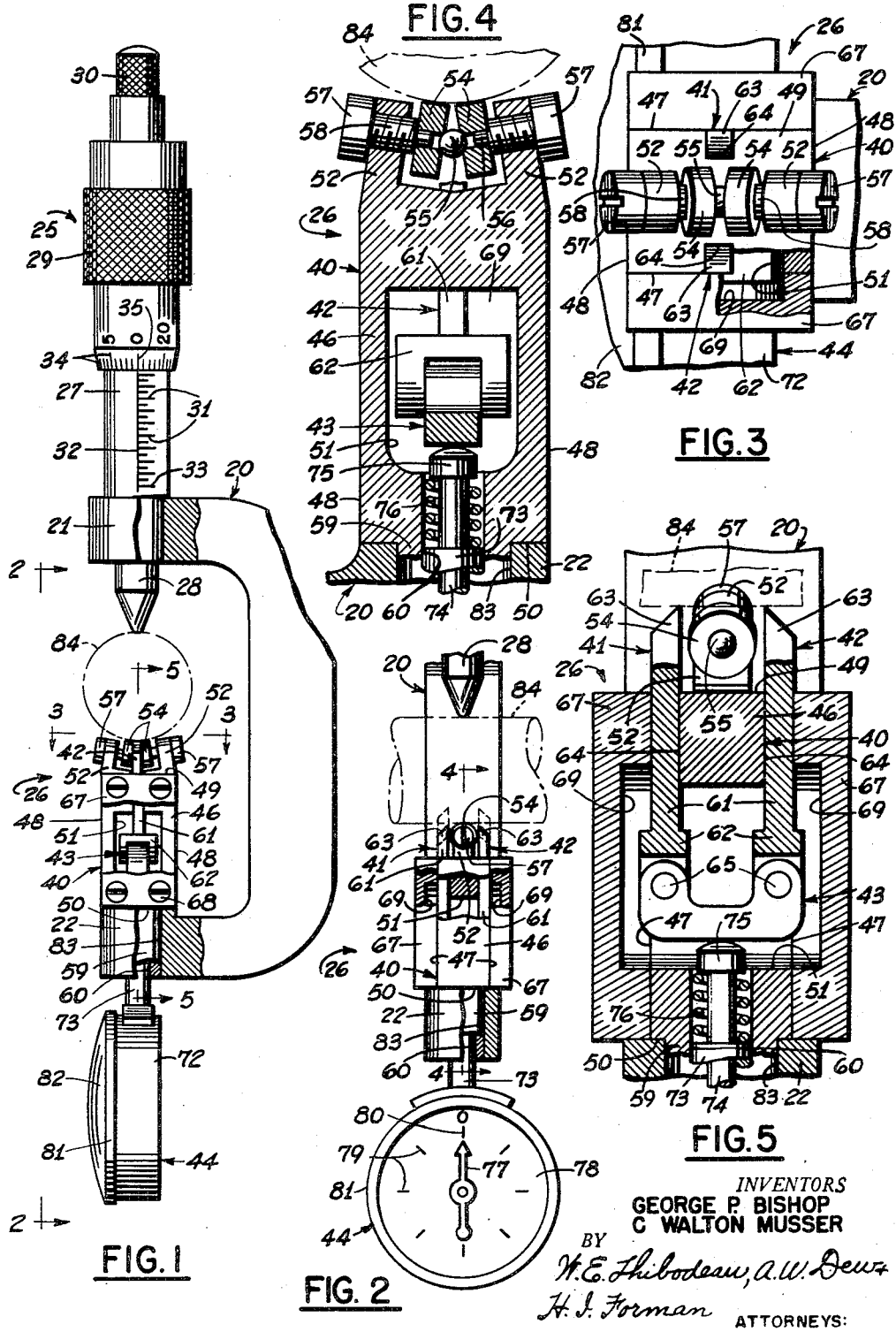
INVENTORS
GEORGE P. BISHOP
C WALTON MUSSER
BY
W. E. Thibodeau, A. W. Dewy
H. J. Forman  ATTORNEYS:

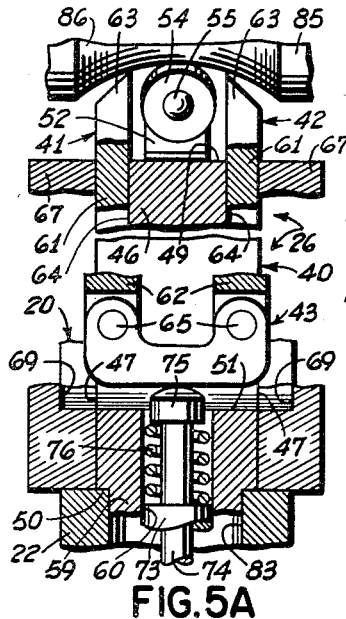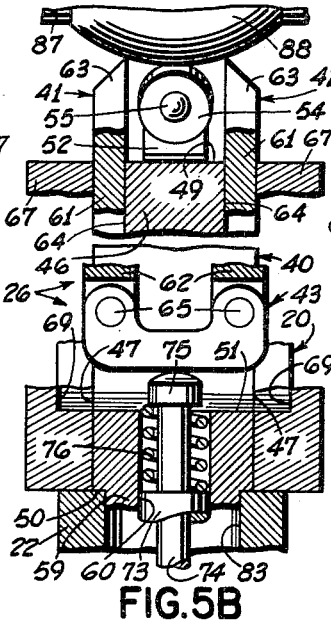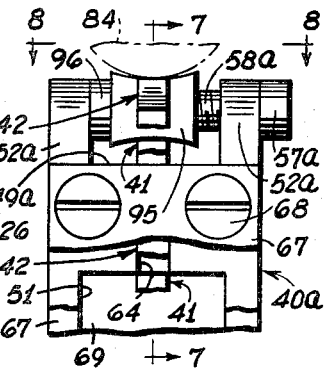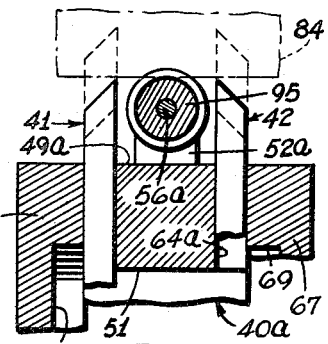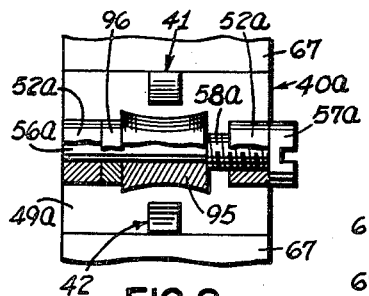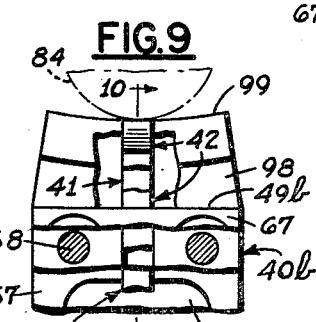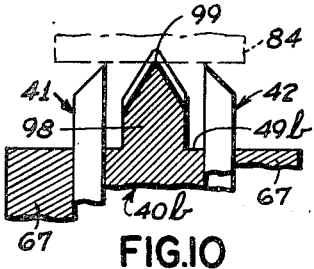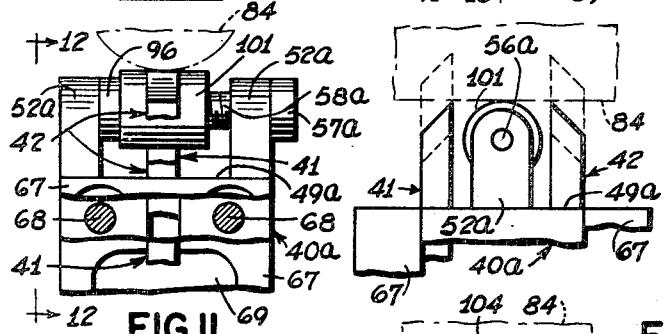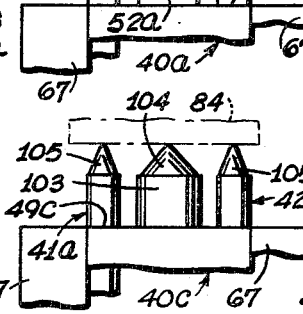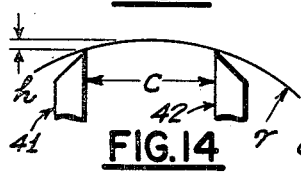
INVENTORS
GEORGE P. BISHOP
C WALTON MUSSER

United States Patent Office 2,693,645
Patented Nov. 9, 1954

2,693,645

COMBINATION CALIPER AND RADIUS MEASURING INSTRUMENT

C Walton Musser, Philadelphia, and George P. Bishop, Croydon, Pa., assignors to the United States of America as represented by the Secretary of the Army Application October 9, 1953, Serial No. 385,307

17 Claims. (Cl. 33—174)

(Granted under Title 35, U. S. Code (1952), sec. 266)

The invention described herein may be manufactured and used by or for the Government for governmental purposes without the payment of any royalty thereon.

Broadly stated, our invention relates to measuring and testing instruments. In particular, it relates to a combination instrument for measuring simultaneously the changing diameter and radius of curvature of the circumferentially concave portion of a cylindrical specimen of material undergoing a test of tensile strength. By "circumferentially concave portion of a cylindrical specimen" we mean that portion of the specimen, as taken along the longitudinal axis thereof, whose circumference progressively decreases from the one end of that portion until a lesser circumference is reached, and then progressively increases until the opposite end of that portion is reached. Additionally, our combination instrument can also be used to measure simultaneously the diameter and radius of curvature of a circumferentially convex portion of a cylindrical specimen. By "circumferentially convex portion of a cylindrical specimen" we mean that portion of the specimen, as taken along the longitudinal axis thereof, whose circumference progressively increases from the one end of that portion until a larger diameter is reached, and then progressively decreases until the opposite end of that portion is reached. From the foregoing statements as to what is meant by circumferentially concave and circumferentially convex portions of cylindrical specimens, it is understandable that, when we refer to a circumferentially curved portion of a cylindrical specimen, we mean a portion thereof which may be either circumferentially concave or circumferentially convex. Furthermore, as the description progresses, it will be shown that a portion of our combination instrument can be used as an instrument to measure radii of curvature of plain convex surfaces and of spherical convex surfaces; and, when made according to certain alternate constructions which we shall also disclose, can be used alone (i. e., detached from the remainder of the combination instrument) as an instrument to measure radii of curvature of plain concave surfaces and of spherical concave surfaces.

Those skilled in the art know that many materials, especially some metals, when subjected to a test of tensile strength, become progressively concave circumferentially as the test continues. As the test load is increased, the radius of the circumferentially concave portion becomes greater and the least diameter of the circumferentially concave portion becomes smaller until, finally, the specimen separates, usually at the smallest diametered portion of the circumeferential concavity. Those making analytical studies of tensile stresses and strains often find it desirable to measure the changing diameter and radius of curvature of the specimen's circumferentially concave portion simultaneously as the test progresses.

Before our invention, however, it was not possible to measure such dimensions simultaneously. Each dimension had to be measured separately so that, in measuring both, a great amount of time was consumed.

In essence our combination instrument comprises a C-shaped frame of convenient dimensions. In one end of the frame is a micrometer head and, in the other end of the frame, coaxial therewith, is an anvil unit.

As is usual practice, the micrometer head contains a micrometer screw which is rotatable within a barrel mounted in the frame. This barrel is provided with graduations along its length. The micrometer screw is attached to a thimble whose open end is also graduated around its periphery so as to lie in the usual relationship to the graduations on the barrel. Therefore, as the thimble is rotated, the micrometer screw is also rotated and is caused to move with the thimble in an axial direction relative to the barrel. The amount of the movement can be determined by reading the micrometer in well known manner.

The anvil unit comprises a box-like housing from one end of which two parallel, spaced chord slides project. These chords slides are slidably accommodated in the housing and are movable relative to a bed which is located on the outside of the housing equidistant between the chord slides and in apposition to the micrometer screw. The ends of the chord slides inside the housing are connected together by a link.

In abutment with this link is the free end of the spindle of a dial indicator gage which is also mounted in the housing in the end opposite that from which the chord slides project. Movement of the chord slides relative to the bed is communicated through the link to the dial indicator from which the radius of curvature can be read.

When our combination instrument is used, the diameter of the specimen's circumferentially concave portion is measured between the bed and the free end of the micrometer screw, while the radius of curvature of that portion is simultaneously indicated by the dial indicator.

As will later be shown, it is the anvil unit of our combination instrument which can be used as an instrument to measure radii of curvature of plain convex surfaces and of spherical convex surfaces; this unit, furthermore, when made according to certain alternate constructions, can be used separately from the rest of the combination instrument to measure radii of curvature of plain concave surfaces and of spherical concave surfaces.

One object of our invention is to provide a combination instrument for measuring the diameter and radius of curvature of a specimen simultaneously.

Another object is to provide an instrument for measuring radii of curvature of both plain and spherical concavities and of both plain and spherical convexities.

The foregoing and other objects and advantages of our invention will become apparent from an inspection of the following description and the accompanying drawings which pertain to one preferred embodiment of our invention and to various alternate constructions thereof. In the drawings:

Fig. 1 is a rather comprehensive view of our combination instrument, partly broken away and partly sectioned, showing various components thereof. For ease of subsequent description, a cylindrical master plug used in calibrating our instrument is shown in the instrument and is indicated in phantom line.

Fig. 2 is a view, partly broken away and partly sectioned, of the lower portion (i. e., toward the bottom of the drawing sheet) of our combination instrument taken alone line 2—2 of Fig. 1 and showing additional details of that portion of the instrument.

Fig. 3 is a view, somewhat enlarged, and also partly broken away and partly sectioned, of the lower portion of our combination instrument taken along line 3—3 of Fig. 1 and showing positional relationships existing between certain of the instrument's components.

Fig. 4 is a vertical cross-section, also enlarged, taken along line 4—4 of Fig. 2 and showing some details of internal construction of our instrument's lower portion.

Fig. 5 is a vertical cross-section, also enlarged, taken along line 5—5 of Fig. 1 and showing further details of internal construction.

Fig. 5A is similar to Fig. 5, but a cylindrical workpiece having a circumferentially concave portion has been substituted for the cylindrical master plug shown in the latter figure.

Fig. 5B is also similar to Fig. 5, but a cylindrical workpiece having a circumferentially convex portion has been substituted for the cylindrical master plug shown in the latter figure.

Fig. 6 is a partly broken away enlargement of a corresponding portion of Fig. 1, but showing an alternate construction thereof. In Fig. 6 a circumferentially concave roller has been substituted for the inclined rollers shown in Fig. 1.

Fig. 7 is a vertical cross-section similar to Fig. 5 but taken along line 7—7 of Fig. 6 and showing, in solid line, the positional relationship existing between the roller and the instrument's chord slides when the cylindrical master plug extends across those members. The extremities between which the chord slides are capable of moving relative to the roller are indicated in dashed line.

Fig. 8 is a plan view similar to Fig. 3, but taken along line 8—8 of Fig. 6 and showing the manner of rotatably supporting the circumferentially concave roller.

Fig. 9 is also a partly broken away enlargement of a corresponding portion of Fig. 1, but shows a second alternate construction thereof. In the former figure a rib having a concave edge has been substituted for the inclined rollers shown in the latter figure.

Fig. 10 is a vertical cross-section similar to Fig. 7, but taken along line 10—10 of Fig. 9 and showing the positional relationship existing between the rib and the instrument's chord slides when the cylindrical master plug extends across those members.

Fig. 11 is also a partially broken away enlargement of a corresponding portion of Fig. 1, but showing a third alternate construction thereof. In the former figure a plain cylindrical roller has been substituted for the inclined rollers shown in the latter figure.

Fig. 12 is a side view similar to Fig. 7, but taken along line 12—12 of Fig. 11 and showing the relationship between the roller and the chord slides when the master plug extends across those members. As in Fig. 7, the extremities between which the chord slides are capable of moving relative to the roller are shown in dashed line.

Fig. 13 is a partially broken away enlargement of a corresponding portion of Fig. 2, but showing a fourth alternate construction of the instrument's lower portion. In the former figure a cylindrical lug having a blunted conical tip has been substituted for the inclined rollers (one of which is shown in the latter figure) and the instrument's' chord slides have also been provided with blunted conical tips; and Fig. 14 is a pictorial representation of the well-known geometrical principle which forms the basis for operation of the radius of curvature measuring aspect of our invention.

In order to facilitate the comprehension of our invention and the appreciation of the inventive novelty residing therein, the essential details of the preferred embodiment and of certain alternate constructions thereof will be explained.

Frame

As shown in Fig. 1, the basic structural member of our combination instrument is the "C"-shaped frame 20 of any convenient dimensions and having the ends 21 and 22. As usual, these ends, in addition to being spacedly opposed, are in direct alignment with each other.

Securely positioned in the frame's end 21 in any well-known manner (not shown) is the micrometer head 25 (see Fig. 1), and similarly secured in the frame's opposite end 22 is the anvil unit 26 (also see Figs. 2 to 5B). The essential details of these parts follow.

Micrometer head

The construction, operation and use of micrometer heads, per se, are well known to those skilled in the mechanical arts and are not the subject of the present invention. For that reason no description other than identification and brief explanation of those parts necessary to complement the description of our combination instrument will be made.

As shown in Fig. 1, micrometer head 25 includes the barrel 27 which is adjustably positionable axially in the frame's end 21, the micrometer screw 28 which is threadedly rotatable in the barrel, and the thimble 29 which is attached in usual fashion to the micrometer screw for the purpose of rotating that screw in the barrel. Optionally, thimble 29 may be provided with the ratchet mechanism 30.

Barrel 27 is provided with the graduations 31 which are located along the axially extending reference line 32 and are equally spaced from the zero line 33 (see Fig. 1). Generally, these graduations extend through a distance of one inch, and the space between the graduations is 0.025 inch.

Thimble 29 is provided, at its open end, with the angularly spaced circumferential graduations 34 which are equally spaced from the zero line 35 (see Fig. 1). In common practice there are twenty-five graduations on the thimble. Therefore, when the thimble is rotated the distance between two of its adjacent graduations relative to the barrel's reference line 32, the thimble, together with the micrometer screw, moves axially 0.001 inch, or one twenty-fifth of the distance between any two of the barrel's adjacent graduations, relative to the barrel. By correlation, when the thimble is rotated one complete revolution, the thimble and the micrometer screw move axially 0.025 inch, or the full distance between any two of the barrel's adjacent graduations, relative to the barrel.

Anvil unit

Anvil unit 26 comprises the housing 40 (see Figs. 1 to 5B), the chord slides 41 and 42 (see Figs. 2, 3 and 5 to 5B), the link 43 (see Figs. 1 and 4 to 5B), and the dial indicator 44 (see Figs. 1 to 3). The essential details of these parts follow.

Housing 40 has the body portion 46 (see Figs. 1 to 5B) which, in essence, is a rectangular solid bounded by the opposed, parallel, plain surfaces 47 (see Figs. 2, 3 and 5 to 5B) between which extend the side surfaces 48 (see Fig. 1), and by the end surfaces 49 and 50 (see Figs. 1, 2 and 5 to 5B). Extending through the body portion between opposed plain surfaces 47 is the opening 51 (see Figs. 1, 2 and 4 to 5B) which accommodates the link and part of the chord slides.

Projecting from end surface 49 are the ears 52 (see Figs. 1, 3 and 4). These ears are in opposed, spaced relationship to each other and are so located that the distance between them extends in a direction substantially perpendicular to that of opening 51 (see Figs. 1 to 5B). As best shown in Figs. 1 and 4, these ears are inclined a substantially equal amount, with reference to end surface 49, toward each other.

Rotatably mounted between ears 52 are the rollers 54 (see Figs. 1, 2 and 4) which are separated by the spherical spacer 55 (see Figs. 3 to 5B). Each roller is rotatable upon the shank portion 56 of the screw 57 which has the threaded portion 58 accommodated in the respective ear (see Fig. 4). Although the rollers shown in the drawings are solid, except for the axial opening which accommodates the screw's shank portion 56, we desire to point out that these rollers, optionally, may also take the form of an antifriction bearing, various types of which are well known to those skilled in the art. It can be seen in Figs. 3 and 4, that, although the axis of each screw lies in the same imaginary plane, the axes of screws 57, and therefore the axes of rotation of rollers 54, are not continuous with each other. Instead, the axes are inclined a substantially equal amount relative to end surface 49 so as to form a rather shallow V which originates at the center of spherical spacer 55 and faces away from end surface 49. Rollers 54 can be considered as comprising the bed of our combination instrument.

Projecting from the housing's end surface 50 is the cylindrical shank 59 (see Figs. 1, 2 and 4 to 5B) having the axial opening 60 which extends through the shank and into the body's opening 52 (see Figs. 4 to 5B). This opening 60 is provided to accommodate a portion of dial indicator 44 later to be explained.

Chord slides 41 and 42 are substantially identical in size and shape; therefore, a description of one will suffice for both. Each slide has the shank portion 61 and the yoke portion 62 (see Figs. 4 to 5B). The shank is provided with the chisel-shaped end 63 (see Figs. 5 to 5B) and, in the present instance, is of square cross-section. The shank, of course, may be of other cross-sectional shapes (e. g., rectangular, triangular, or circular) and may have other types of shaped ends (e. g., conical).

The chord slides are located in housing 40 in opposed, spaced relationship to each other, one on each side of rollers 54 (see Fig. 3). Each chord slide is slidably accommodated in a correspondingly shaped groove 64 formed in the body's opposed, plain surfaces 47 (see Figs. 3 and 5 to 5B). As shown in Figs. 4 to 5B, each chord slide is placed in housing 40 with yoke portion 62 accommodated in the housing's opening 51; and, as shown in Figs. 5 to 5B, with the shank 61 projecting from the housing's end surface 49 so that the chisel-shaped ends 63 faces away from rollers 54. These chord slides are so located in the housing as to be a substantially equal amount on each side of the axes of rollers 54 (see Figs. 5 to 5B).

Link 43 slidably fits into yoke portion 62 of each of the spaced chord slides, thereby spanning the distance therebetween (see Figs. 5 to 5B). One end of the link is secured to the yoke portion of chord slide 41 so as to allow relative pivotal movement between those parts; and the opposite end of the link is similarly secured to the yoke portion of chord slide 42. This connection is by means of the pin 65 which is a force fit in the link, but a slide fit in each yoke portion.

From the explanation thus far, it will be understood the the chord slides are slidable in unison relative to housing 46, or are independently slidable relative to the housing. It will also be obvious that, if link 43 be tilted, one chord slide will move into housing 40 while the other will move out of the housing.

Positioned on each of the body's opposed plain surfaces 47 and covering each end of the body's opening 51 is the cover 67 (see Figs. 2, 3 and 5 to 5B). Each cover is secured in place in any convenient manner as by the screws 68 (see Fig. 1). As shown in Figs. 5 to 5B, the inner surface of each cover is provided with the recess 69 which accommodates the yoke portions of the respective chord slides and also the ends of link 43 to allow movement of those parts. These covers also serve to hold the chord slides in body 46, yet do not interfere with their sliding movement relative thereto.

Dial indicator 44 is of well-known construction and operation. For that reason, and also because the indicator, per se, like micrometer head 25, is not the subject of the invention under discussion, only a brief reference to some of the indicator's components and to its operation will be made in order to complement description of the present invention.

The dial indicator includes the body portion 72 (see Figs. 1 and 2) which contains a conventional mechanism (not shown), the stem portion 73 (see Figs. 1, 2 and 4 to 5B) which is integral with the body portion, and the spindle 74 (see Figs. 4 to 5B) which is slidable axially relative to the stem.

Normally, spindle 74 is under influence of a spring (not shown) inside body 72 so that the free end 75 of the spindle is constantly urged away from the indicator's stem portion 73. In being so urged, the spindle's free end pushes against link 43 and tends constantly to push the link away from the indicator's stem portion. Because chord slides 41 and 42 are connected to link 43, as earlier explained, this push on the link tends, at all times, to move the chord slides so that their chisel-shaped ends 63 are the maximum distance possible from the housing's end surface 49 as indicated by broken line in Figs. 2, 7 and 12. In order to supplement the action of the spring within the indicator's body, we have added the spring 76 (see Figs. 4 to 5B) between the free ends of the stem portion and of the spindle.

Spindle 74 is connected by means of the indicator's mechanism (not shown) to the pointer 77 which is rotatably movable relative to the dial 78 (see Fig. 2) in consequence of the spindle's movement in stem 73. As the spindle moves axially in one direction (e. g., into the stem), pointer 77 operatively associated therewith is rotated in a clockwise direction (as viewed in Fig. 2) relative to dial 78; and, as the spindle moves in the opposite direction (i. e., out of the stem), the pointer is rotated in a counterclockwise direction relative to the dial. In either case, therefore, movement of the spindle is indicated by movement of the pointer relative to the dial.

Usually dial 78 is graduated with radially extending lines so that the angular space therebetween represents a certain amount (e. g., 0.001 inch) of linear travel of spindle 74 relative to stem 73. However, because one function of our invention is to measure radii of convex and concave curvatures, we find it preferable to have dial 78 graduated so that the radial lines indicate different values of radius. In our instrument we use the graduations 79 (some of which are shown in Fig. 2), each one denoting a progressively larger radius, on each side of the zero line 80 (also see Fig. 2). By doing this, we make it possible to read radii of concavity directly from the graduations on one side of the zero line, and radii of convexity from the graduations on the other side of the zero line. For ease of reading, the graduations denoting radii of concavity can be a different color than those graduations denoting radii of convexity. The particular manner of graduating or coloring the dial, however, is purely a matter of choice.

Dial 78 is connected in usual fashion to the bezel 81 (see Figs. 1 to 3) and is covered by the transparent crystal 82 (see Figs. 1 and 3). As is customary in this type of construction, bezel 81 is selectively rotatable relative to the indicator's body 72 so as to rotate dial 78 relative to pointer 77. In other words, for any given position of the pointer within the full scope of its available travel, the dial can be rotated by rotating the bezel, so as to place the dial's zero line 80 in coincidence with pointer 77. This feature becomes useful in preparing our instrument for use as will be described later. In order to hold the bezel, and therefore the dial, in the desired position, a selectively operable clamping means (not shown) is provided on the indicator's body.

As shown in Figs. 1 and 2, anvil unit 26 is positioned in frame 20 in opposition to micrometer head 25 through agency of cylindrical shank 59. As shown in those figures, and also in Figs. 4 to 5B, this shank is accommodated in the opening 83 in the frame's end 22. When the anvil unit is in position in frame 20, the axis of micrometer screw 28 is directed toward the center of spherical spacer 55 and is continuous with the axis of cylindrical lug 59. After positioning in the frame, the anvil unit can be secured in place in any convenient manner (not shown).

After the anvil unit is in place in frame 20, dial indicator's stem portion 73 is inserted into cylindrcal shank 59 of the anvil unit's housing 40 where it is accommodated in recess 60 (see Figs. 1, 2, and 4 to 5B). The indicator is inserted until free end 75 of its spindle abuts link 43 and moves that link and chord slides 41 and 42 so that the chord slides project their full amount from end surface 49 of the anvil unit's housing 40 (see Fig. 2).

Preparing instrument for use

Before our combination instrument can be used to measure diameter and radius of curvature simultaneously, with accuracy, it must be calibrated. In calibrating the instrument, we use the cylindrical master plug 84 (see Figs. 1, 2, 4 and 5) which, in the present instance, is 0.500 inch in diameter. However, any other convenient size could be used depending upon various parameters. Calibration is accomplished as follows:

Assuming use of the cylindrical master plug 0.500 inch in diameter, thimble 29 is rotated relative to barrel 27 until the micrometer head reads 0.500 inch. The plug is rested upon rollers 54 and barrel 27 is moved axially in the frame's end 21 until the micrometer screw's free end rests with desired pressure against the master plug. After the barrel is so positioned in the frame, the barrel can be secured in any convenient manner (not shown).

In placing the master plug upon rollers 54, chord slides 41 and 42 will be contacted by the master plug and will be moved into housing 40 even though spring 76 tends to move the slides in the opposite direction. This movement of the chord slides, in turn, causes link 43 to move against free end 75 of the indicator's spindle 74. This action causes spindle 74 to be moved into the indicator's stem portion 73, also against action of spring 76, and pointer 77 is consequently caused to rotate relative to dial 78.

Since the master plug 84 has no circumferentially curved portion, it is desired that dial indicator 44 read "zero." Therefore, in order to accomplish this, the bezel clamping means (not shown) is loosened and bezel 81 is rotated, thus turning dial 78 attached thereto, until the dial's zero line 80 lies in coincidence with pointer 77. When that is accomplished, the bezel clamping means is retightened to hold the dial in the selected position. This completes the calibration procedure.

Operation

After calibrating, our combination instrument can be used on the cylindrical specimen of material 85 (see Fig. 5A), undergoing a test of tensile strength to measure the diameter and the radius of curvature of the circumferentially concave portion 86 which appears in the specimen as the test progresses. This is done as follows:

Assuming the test of tensile strength to have progressed far enough to have instituted formation of a circumferentially concave portion in the specimen, thimble 29 is rotated enough to provide sufficient space between the micrometer screw's free end and the chord slides' chisel-shaped ends 63 to allow application of our combination instrument to the specimen's constricted portion. Thimble 29 is then turned so that the micrometer screw's free end approaches rollers 54. As this turning is continued, the space between the rollers and the micrometer screw's free end naturally decreases. In consequence of this action, the instrument, by virtue of rollers 54, seats itself at the smallest diametered part of the circumferentially concave portion so that the diameter of that part can be read from micrometer head 25. Additionally, chord slides 41 and 42 are moved into housing 40 so that their chisel-shaped ends 63 are closer to the housing's end surface 49 than they were during calibration with master plug 85 (compare Figs. 5 and 5A). In other words, the chord slides have been displaced a certain amount relative to rollers 54 so as to cause the indicator's pointer to indicate the radius of curvature rather than zero as it did during calibration.

After the initial diameter and radius of curvature are noted, the test load (not shown) applied to the specimen is increased an arbitrary amount and a second pair of readings are taken for the purpose of determining any change in the diameter and radius of curvature. Likewise, at convenient intervals during the test, successive readings of diameter and radius of curvature are made simultaneously so that, after completion of the test, further study and analysis of the specimen's behavior can be made.

Conversely to measuring the diameter and radius of curvature of the circumferentially concave portion of a cylindrical specimen, our combination instrument can similarly be used to measure simultaneously the diameter and radius of curvature of a circumferentially convex portion of a cylindrical specimen. Referring to Fig. 5B, our instrument has been applied to the cylindrical specimen 87 having the circumferentially convex portion 88 for just that purpose. The manner of determining diameter is similar to that which has already been explained, so will not be repeated. Comparing Fig. 5B with Figs. 5 and 5A, note in Fig. 5B that chord slides 41 and 42 have moved farther away from end surface 49. In other words the displacement of the chord slides relative to rollers 54 is opposite to that which occurred when a specimen having a circumferentially concave portion was measured. Just as in that case, movement of the chord slides causes corresponding movement of the indicator's pointer 77 relative to dial 78. However, with a circumferentially convex portion, the pointer moves in the opposite direction from zero line 80 (see Fig. 2) and comes to rest at one of the dial's graduations indicating the radius of curvature of the specimen's circumferentially convex portion.

With our combination instrument, the radius of curvature is found in terms of chord length based on the well-known formula, $$r = \frac{c^2 + 4h^2}{8h}$$

wherein:
$r$ = radius of curvature,
$c$ = length of chord,
and
$h$ = chord height (i. e., the radial distance from the circular arc to the chord perpendicular to the chord) (see Fig. 14)

In our instrument, chord length is represented by the fixed distance between chord slides 41 and 42. In the present instance this amounts to 0.188 inch. Chord height, which is variable, is represented by the displacement between the chord slides and the rollers and is marked by the indicator's pointer 77 on graduated dial 78. This dial, as earlier mentioned, can be graduated in terms of radii so as to be direct reading, thus avoiding the necessity for extra figuring or interpolation.

Having described and illustrated our combination instrument for simultaneously measuring diameter and radius of curvature, it will be apparent to those skilled in the art that anvil unit 26 can be used as an instrument to measure radii of curvature of plain and spherical convexities, and also that the anvil unit can be removed from frame 20 and, with certain modifications which we shall describe, can be used alone as an instrument for measuring radii of curvature of plain and spherical concavities. To do this, the anvil unit is placed, chord slides foremost, against the radius of curvature to be measured, and the radius of curvature is read directly from the dial indicator.

*Alternate constructions*

To facilitate the extended use of our invention, we contemplate various alternate constructions of the anvil unit presently to be described. It will be evident to those skilled in the art, however, that the use of anvil units made in accordance with the alternate constructions is not restricted to the use of the different anvil units detached from the frame. In fact, the differently modified anvil units can also be used in the frame in conjunction with micrometer head 25 for the purpose earlier mentioned, if desired.

In the first alternate construction shown in Figs. 6 to 8 the housing 40a shown in those figures has been provided with the spacedly opposed, parallel ears 52a between which the screw 57a extends parallel to the housing's end surface 49a. This screw has the elongated shank portion 56a (see Figs. 7 and 8) which is accommodated in one ear (see Fig. 8) and the threaded portion 58a which is accommodated in the other ear (see Figs. 6 and 8). Rotatably supported upon the screw's shank portion 56a is the circumferentially concave roller 95 (see Figs. 6 to 8). This roller is so positioned on the screw, through agency of the spacer 96 (see Figs. 6 and 8) that the geometrical center of the roller (i. e., a point on its axis equidistant from each end) is in coincidence with the projected axis of cylindrical shank 59 shown in Figs. 1, 2 and 4 to 5B. Because this alternate construction pertains only to the parts shown in Figs. 6 to 8 and above mentioned, other portions of the anvil unit, previously identified, are not shown in those figures nor repeated in the description of the alternate construction.

Instead of providing the circumferentially concave roller just mentioned, we also contemplate the use of a circumferentially convex roller. This form, however, has not been shown in the drawings for reasons of brevity.

The calibration and mode of operation of the anvil unit constructed according to the first alternate construction shown in Figs. 6 to 8 is similar to that already explained in connection with the initially described embodiment and, in view thereof, will be evident to those skilled in the art without additional explanation.

In the second alternate construction shown in Figs. 9 and 10, the housing 40b has been provided with the rib 98 which projects from the housing's end surface 49b. This rib extends across the housing's end surface substantially perpendicular to an imaginary line extending between chord slides 41 and 42. As shown in Fig. 9, this rib is provided with the arcuately concave edge 99. This edge is generated from a center located on the projected axis of the housing's cylindrical shank 59; and, as shown in Fig. 10 the arcuate edge is equidistant between chord slides 41 and 42.

Instead of providing rib 98 with the arcuately concave edge 99, just mentioned, we also contemplate use of a rib having an arcuately convex edge, and also use of a rib having a straight edge. Neither of these forms, however, has been included in the drawings for reasons of brevity.

The calibration and mode of operation of the anvil unit constructed according to the second alternate construction shown in Figs. 9 and 10 is also similar to that already explained in connection with the initially described embodiment and, in view thereof, will be evident to those skilled in the art without additional comment.

In the third alternate construction shown in Figs. 11 and 12, housing 40a, screw 57a, and spacer 86 are used, but the cylindrical roller 101 replaces circumferentially concave roller 95 used in the earlier described first alternate construction illustrated in Figs. 6 to 8.

As mentioned in connection with the previously described alternate construction, the calibration and operation of the third alternate construction is believed to be evident to those skilled in the art without further comment in view of the explanation presented in connection with the initially described and illustrated embodiment.

In the fourth alternate construction shown in Fig. 13, the housing 40c is provided with the cylindrical lug 103 having the conical tip 104, and each chord slide 41a and 42a has also been provided with the conical tip 105.

Conical tip 104 is coaxial with the housing's cylindrical shank 59 and, as shown in Fig. 13, is substantially equidistant from each chord slide's conical tip 105. Additionally, an imaginary plane (not shown) extending between the axes of the chord slide's conical tips 105 will also pass through the axis of the lug's conical tip 104.

Again, the calibration and operation of the anvil unit constructed according to the fourth alternate construction is believed to be evident to those skilled in the art in view of explanations previously made herein, and for that reason are believed not to merit further description.

From the foregoing it will become apparent that we have provided a combination instrument for measuring diameter and radius of curvature simultaneously; and that we have provided a novel means for measuring radii of curvature of both plain and spherical concavities and of plain and spherical convexities.

Those skilled in the art realize that our invention may be modified and varied in numerous ways without departing from the spirit and scope of our original concept, and that the embodiments here described have been chosen for illustrative purposes only without any intention to unduly limit the scope of our inventive concept.

For these reasons we do not want to be limited in patent coverage to the narrow confines inherent in the embodiments shown. We wish, rather, to be limited only by the metes and bounds of the appended claims.

We claim:

1. An instrument for simultaneously measuring the diameter and the radius of curvature of the circumferentially curved portion of a cylindrical specimen, comprising a frame; first measuring means carried by said frame; a bed carried by said frame opposed to said first measuring means for accommodating the specimen's circumferentially curved portion; a pair of chord slides carried by said frame with one end of each slide projecting therefrom and being adapted to contact the specimen's circumferentially curved external portion, the slides being on opposite sides of said bed and each slide being substantially equidistant from the bed, said chord slides also being movable relative thereto toward and away from the specimen; a link connecting said chord slides and capable of pivotal movement relative thereto; and second measuring means carried by said frame operatively associated with said chord slides through said link for measuring the movement of said chord slides relative to said bed; whereby the diameter of the specimen's circumferentially curved portion is measured between said first measuring means and said bed and is indicated by said first measuring means; and whereby the radius of curvature of the specimen's circumferentially curved portion is simultaneously measured by the movement of said chord slides relative to said bed and, through said link, is indicated by said second measuring means.

2. The instrument of claim 1 in which the first measuring means is a micrometer head.

3. The instrument of claim 1 in which the second measuring means is a dial indicator gauge.

4. An instrument for simultaneously measuring the diameter and the radius of curvature of the circumferentially curved portion of a cylindrical specimen, comprising: a frame; a micrometer head carried by said frame; a bed carried by said frame opposed to said micrometer head for accommodating the specimen's circumferentially curved portion; a pair of chord slides carried by said frame with one end of each slide projecting therefrom and being adapted to contact the specimen's circumferentially curved portion, the slides being on opposite sides of said bed and each slide being substantially equidistant from the bed, said chord slides also being movable relative thereto; a link connecting said chord slides and capable of pivotal movement relative thereto; and a dial indicator carried by said frame and operatively associated with said chord slides through said link for measuring the movement of said chord slides relative to said bed; whereby the diameter of the specimen's circumferentially curved portion is measured between said micrometer head and said bed and is indicated by said micrometer head; and whereby the radius of curvature of the specimen's circumeferentially curved portion is simultaneously measured by the movement of said chord slides relative to said bed and through said link, is indicated by said dial indicator.

5. In an instrument for simultaneously measuring the diameter and the radius of curvature of the circumferentially curved portion of a cylindrical specimen, the combination of: a "C"-shaped frame; a micrometer head carried by one end of said frame; a housing carried by the other end of said frame; a bed carried by said housing in opposition to said micrometer head for accommodating the specimen's circumferentially curved portion; a pair of chord slides carried by said housing with one end of each slide projecting therefrom and being adapted to contact the specimen's circumferentially curved portion, the slides being on opposite sides of said bed and each slide being substantially equidistant from the bed, said chord slides also being moveable relative thereto; a link connecting said chord slides inside said housing and being capable of pivotal movement with relation to said chord slides; and a dial indicator carried by said housing in contact with said link for measuring the movement of said chord slides relative to said bed; whereby both the diameter and the radius of curvature of the circumferentially curved portion of a cylindrical specimen can be measured simultaneously.

6. The instrument of claim 5 in which the bed is a rib having a blunted knife edge.

7. The instrument of claim 6 in which the blunted knife edge is arcuately curved toward the micrometer head, the center of the arcuate curve lying on the projected axis of the micrometer head.

8. The instrument of claim 6 in which the blunted knife edge is arcuately curved away from the micrometer head, the center of the arcuate curve lying on the projected axis of the micrometer head.

9. The instrument of claim 5 in which the bed is a single cylindrical roller, the axis of said roller being substantially perpendicular to the micrometer head's axis and passing through the projected axis of the micrometer head.

10. The instrument of claim 5 in which the bed is a cylindrical lug having a blunted conical tip coaxial with the micrometer head, and in which each chord slide is also provided with a blunted conical tip so that an imaginary plane extending between the axes of the chord slides' conical tips passes through the axis of the bed's conical tip.

11. The combination, in an instrument for simultaneously measuring the diameter and the radius of curvature of the circumferentially curved portion of a cylindrical specimen, of: a "C"-shaped frame; a micrometer head carried by one end of said frame; a housing carried by the other end of said frame; a bed formed by a pair of rollers at one end of said housing exterior thereto in opposition to said micrometer head for accommodating the specimen's circumferentially curved portion, the axes of said rollers lying in the same imaginary plane and originating on the projected axis of said micrometer head, but each axis being inclined a substantially equal amount relative to the micrometer head's axis so as to form a V-shaped surface for cradling the cylindrical specimen; a spherical spacer between said rollers with the spacer's geometric center at the point of convergence of said rollers' axes; a pair of chord slides carried by said housing with one end of said slide projecting therefrom and being adapted to contact the specimen's circumferentially curved portion, the slides being on opposite sides of said rollers and each slide being substantially equidistant from said rollers, said chord slides also being movable relative thereto; a link connecting said chord slides inside said housing and being capable of pivotal movement with relation to said chord slides; and a dial indicator gauge carried by said housing in contact with said link for measuring the movement of said chord slides relative to said rollers; whereby both the diameter and the radius of curvature of the circumferentially curved portion of a cylindrical specimen can be measured simultaneously.

12. The combination of claim 11 wherein the rollers forming the bed are anti-friction bearings.

13. The instrument of claim 12 in which the means for holding the rollers properly inclined with respect to the housing comprises a pair of ears in opposed, spaced relationship inclined a substantially equal amount relative to the micrometer head's axis, and a screw threadedly secured to each of said ears, each said screw having a shank portion which rotatably supports one of the rollers thereon.

14. An instrument for measuring the diameter and the radius of curvature of the circumferentially curved portion of a cylindrical specimen, comprising: a C-shaped frame; a micrometer head carried by one end of said frame; a housing carried by the other end of said frame; a bed formed by a pair of rollers at one end of said housing and extending exterior thereto in opposition to said micrometer head for accommodating the specimen's circumferentially curved portion; means carried by said housing for supporting said rollers so that the axes thereof lie in the same imaginary plane and originate on the projected axis of said micrometer head, but so that each axis is inclined a substantially equal amount relative to the micrometer head's axis; a spherical spacer between said rollers with the spacer's geometric center at the point of convergence of said rollers' axes; a pair of chord slides carried by said housing with one end of each slide projecting therefrom and being adapted to contact the specimen's circumferentially curved portion, the slides being on opposite sides of said rollers and each slide being substantially equidistant from said rollers, said chord slides also being movable relative thereto; a link connecting said chord slides inside said housing and being capable of pivotal movement with relation to said chord slides; and a dial indicator gauge carried by said housing in contact with said link for measuring the movement of said chord slides relative to said rollers; whereby both the diameter and the radius of curvature of the circumferentially curved portion of a cylindrical specimen can be measured simultaneously.

15. In an instrument for simultaneously measuring the diameter and the radius of curvature of the circumferentially concave portion of a cylindrical specimen, the combination of: a C-shaped frame; a micrometer head carried by one end of said frame; a housing carried by the other end of said frame; a bed formed by a roller at one end of said housing and extending exterior thereto in opposition to said micrometer head, said roller having a circumferentially curved lateral surface for accommodating the specimen's circumferentially concave portion, the axis of said roller being substantially perpendicular to and intersecting said micrometer head's projected axis; screw means carried by said housing for supporting said roller; a pair of chord slides carried by said housing with one end of each slide projecting therefrom and being adapted to contact the specimen's circumferentially concave portion, the slides being on opposite sides of said roller and each slide being substantially equidistant from said roller, said chord slides also being movable relative thereto; a link connecting said chord slides inside said housing and being capable of pivotal movement with relation to said chord slides; and a dial indicator gauge carried by said housing in contact with said link for measuring the movement of said chord slides relative to said roller; whereby the diameter and the radius of curvature of the circumferentially concave portion of a cylindrical specimen can be measured simultaneously.

16. The instrument of claim 15 in which the lateral surface of the roller is concave.

17. The instrument of claim 15 in which the lateral surface of the roller is convex.

References Cited in the file of this patent

UNITED STATES PATENTS

| Number | Name | Date |
|---|---|---|
| 1,194,835 | Gordon | Aug. 15, 1916 |
| 1,389,381 | Renton | Aug. 30, 1921 |
| 1,634,156 | McCommon | June 28, 1927 |